United States Patent [19]
Fujita et al.

[11] Patent Number: 4,680,151
[45] Date of Patent: Jul. 14, 1987

[54] INJECTION PRESSURE MONITORING METHOD AND APPARATUS

[75] Inventors: Shigeru Fujita, Numazu; Hideo Banzai, Mishima; Hideo Tanaka, Numazu, all of Japan

[73] Assignee: Toshiba Kikai Kabushiki Kaisha, Tokyo, Japan

[21] Appl. No.: 828,684

[22] Filed: Feb. 12, 1986

Related U.S. Application Data

[62] Division of Ser. No. 592,016, Mar. 21, 1984, Pat. No. 4,585,931.

[30] Foreign Application Priority Data

Mar. 23, 1983 [JP] Japan .................................. 58-48450

[51] Int. Cl.$^4$ ............................................. B29C 47/92
[52] U.S. Cl. .................................... 264/40.3; 425/149
[58] Field of Search .................... 264/40.1, 40.3, 40.7; 425/135, 136, 143, 149, 170, 145, 146

[56] References Cited

U.S. PATENT DOCUMENTS 4,207,047 6/1980 Kolb et al. .......................... 425/149

Primary Examiner—Jay H. Woo
Assistant Examiner—Timothy W. Heitbrink
Attorney, Agent, or Firm—Stevens, Davis, Miller & Mosher

[57] ABSTRACT

A method of monitoring data concerning injection pressure in an injection molding machine is disclosed in which a multipoint sampling technique is used to acquire and store injection pressure reference data in the form of a time varying data curve for a first injection molding cycle. The reference data is used to form upper allowance data which is stored in the form of a time varying data curve having a constant offset from the reference data curve. The upper allowance data is then compared with injection pressure data acquired using a multipoint sampling technique during a second injection molding cycle and an alarm is issued if the data acquired in the second injection molding cycle exceeds the upper allowance data.

3 Claims, 3 Drawing Figures

# INJECTION PRESSURE MONITORING METHOD AND APPARATUS

This is a division of application Ser. No. 592,016, filed Mar. 21, 1984 now U.S. Pat. No. 4,585,931.

BACKGROUND OF THE INVENTION

This invention relates to a pressure monitoring method and apparatus of an injection molding machine and more particularly to a method and apparatus for monitoring an abnormal rise of an injection pressure during an injection process of an injection molding machine thereby to protect a molding machine and molds against the abnormal or undesirable pressure rise.

An injection pressure at the injection operation of the injection molding machine is generally determined in accordance with a flow resistance of a material resin based on a shape of a mold to be used and an apparent viscosity of the material resin, so that an injection pressure is initially relatively low and gradually rises as the material resin fills the mold cavities, and finally, a profile representing substantially constant injection pressure is continuously detected during one injection operation cycle of the injection molding machine.

In a case where a plurality of mold products or a relatively large one mold product are to be obtained by an injection molding machine provided with a plurality of injection gates, a few of which are clogged with the material resin by a certain reason during the injection operation, flow speed of the material resin passing the other gates is obliged to increase and the injection pressure also abnormally rises, which may result in non-conformity of mold products and, sometime, in breaking of the molds or molding machine.

In order to obviate these defects or disadvantages in the injection molding operation, there is known a monitoring device which generates a signal for informing of the fact that an injection pressure during the operation abnormally exceeds a predetermined injection pressure. However, as described before, since the injection pressure, in fact, gradually increases as the material resin fills the molds during the injection process, it is difficult to accurately predetermine an injection pressure as a constant set pressure which is deemed as a standard for generating an alarm signal for informing of an abnormal pressure condition at a time when the injection pressure exceeds this set pressure. Moreover, there will occur a case where an abnormal pressure condition is not informed of in spite of generation of an abnormal pressure rise during the injection operation or a case where a signal indicating an abnormal pressure rise is generated in spite of a normal injection pressure condition. The reason why such undesirable phenomena occurred will be understood from the following description with reference to FIGS. 1 and 2.

Referring to FIG. 1, which shows a graph having an abscissa axis of time and an ordinate axis of injection pressure and in which four curves 1 through 4 representing injection pressure transitions with time are described. In these pressure curves, only the curve 1 shows a normal pressure transition with time and the curve 2 shows a curve inclusive of allowable upper limit of the curve 1. In use of a conventional monitoring apparatus, when a set pressure is now predetermined as constant value $H_1$, an abnormal injection pressure condition such as shown by the curve 3 which exceeds the set pressure $H_1$ can be detected, but the injection pressure condition such as shown by the curve 4 cannot be detected as an abnormal pressure condition because the curve 4 does not exceed the set pressure $H_1$ in spite of the fact that the curve 4 shows an abnormal pressure condition. On the other hand, a signal informing of an abnormal pressure condition may be generated at a time when an injection pressure rises as shown by a portion M on the curve 2 in spite of the fact that the portion M is within the allowable pressure range. These adverse phenomena in a conventional monitoring apparatus will reside in that a set pressure for detecting an abnormal pressure rise is decided to be always constant in spite of the fact that an injection pressure in the abnormal condition will vary with time.

Referring to FIG. 2 which shows a graph having an abscissa axis of time and an ordinate axis of injection pressure and shows a curve 11 representing an injection pressure transition with time during a certain normal injection operation. In a case where it is now required to monitor the injection pressure at the section A to confirm that the pressure curve 11 in the section B within the section A will not exceed the highest injection pressure portion N in the section A by predetermining a certain set pressure $H_2$ which is somewhat lower than the highest pressure portion N, in other words, where it is required to monitor the injection pressure so that although the injection pressure curve 11 in the section (A - B) is allowed to exceed the set pressure $H_2$, the injection pressure curve 11 in the section B is not allowed to exceed the set pressure $H_2$, an alarm signal will be generated in use of a conventional monitoring apparatus because the injection pressure portion N in the section (A - B) exceeds the set pressure $H_2$. This is because the set pressure $H_2$ is decided to be constant in spite of the fact that the injection pressure varies with time.

SUMMARY OF THE INVENTION

An object of this invention is to obviate defects or disadvantages in a conventional pressure monitoring method and apparatus of the type described hereinabove and to provide an injection pressure monitoring method and apparatus in which data regarding injection pressure of an injection molding machine is detected as a pressure curve by a multipoint sampling method and compared with allowable upper limit data shown as a variable pressure curve preliminarily obtained by adding an allowance data to a reference data, and an alarm signal can be generated when the detected data exceeds the allowable upper limit data.

Another object of this invention is to provide an injection pressure monitoring method and apparatus in which injection monitoring time can be optionally selected and the monitoring operation can be freely stopped or started.

According to one aspect of this invention there is provided a method for monitoring data regarding continuously varying injection pressure in an injection process of an injection molding machine in which the data regarding the injection pressure is detected as a variable of time and sampled at multipoints continuously during the injection process, and the method is characterized by the steps of storing the detected data of one injection operation cycle of the injection molding machine as reference data, comparing the reference data with data regarding the injection pressure in another one injection operation cycle detected by a multipoint sampling method after the reference data has been stored, and generating an alarm information when a deviation between the detected data and the reference data exceeds a predetermined allowable data.

According to another aspect of this invention there is provided an apparatus for carrying out the monitoring method described above of the type comprising a detector for detecting data regarding an injection pressure in an injection process of an injection molding machine by a multipoint sampling method as a variable of time, and a monitoring system operatively connected to the detector for monitoring detected data, the monitoring system comprising a signal transmitting unit, a memory unit operatively connected to the detector and the signal transmitting unit for storing detected data of an injection process of one injection operation cycle as reference data, an operation unit operatively connected to the memory unit and the signal transmitting unit for calculating an allowable upper limit data of the reference data, and a comparator operatively connected to the operation unit and the detector for comparing the allowable upper limit data with detected data of another one injection operation cycle after the reference data has been stored.

DESCRIPTION OF THE PREFERRED EMBODIMENT

Figure 3:
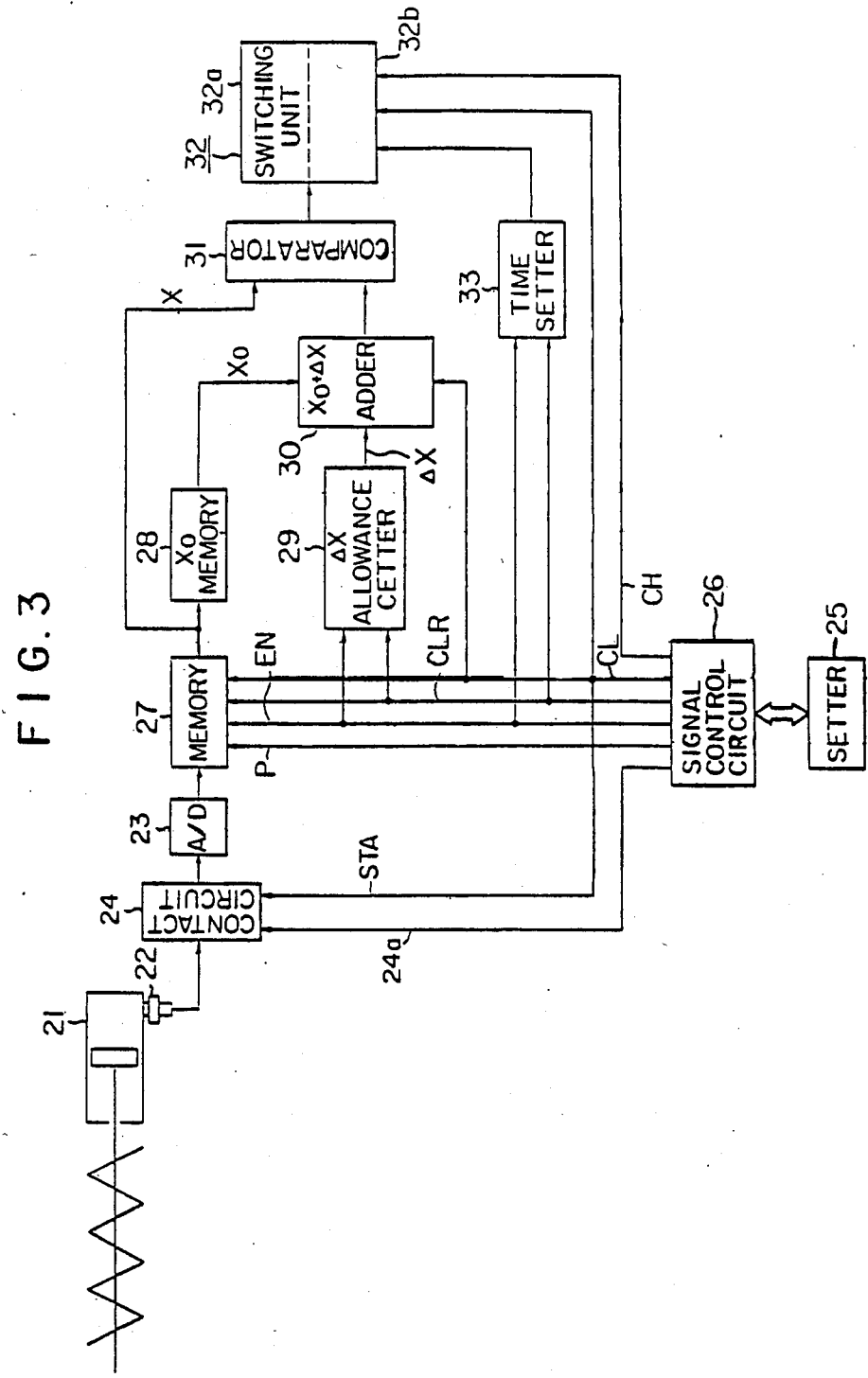
FIG. 3 shows a block diagram of an injection pressure monitoring apparatus according to this invention.

Referring to FIG. 3 showing a block diagram of the monitoring apparatus according to this invention, a sensor 22 is attached to an injection piston-cylinder assembly 21 of an injection molding machine to detect an injection pressure by a multipoint sampling method, and the sensor 22 is operatively connected to a contact circuit 24 for effecting a switching operation. It will of course be noted that although, in this embodiment, the sensor 22 is attached to the piston-cylinder assembly 21 of the injection molding machine, the sensor 22 can be attached to the other member or portion, for example, to a heating cylinder or in a molding cavity of the mold, at which an injection pressure can be detected. The contact circuit 24 is operated by a signal 24a generated from a signal control circuit or signal transmitter 26 by depressing a key member, not shown, provided on a setting unit 25 to select a sensor to be used for detecting the injection pressure among sensors attached to the various portions or members of the injection molding machine or molds. To the setting unit 25 are arranged a plurality of key members, but not shown, for operating the signal control circuit 26 to generate signals for operating on controlling various elements, described hereinafter, in the monitoring apparatus.

Data regarding the injection pressure detected by the sensor 22 is temporarily stored in a data memory 27 through the contact circuit 24 and an analog-ditigal (A/D) converter 23 and the data stored in the data memory 27 is then transferred into a reference data memory 28 by a signal EN generated from the signal control circuit 26 by depressing a key member located on the setting unit 25 for setting a reference data at a time when an operator discriminates that the detected data stored in the data memory 27 corresponds to the reference data, thus storing the data in the reference data memory 28 as a reference data $X_0$. An allowance data $\Delta X$ predetermined with respect to the reference data $X_0$ is set in an allowance setter 29 by the signal EN from the signal control circuit 26 and the allowance data $\Delta X$ can be cleared by a signal CLR generated from the signal control circuit 26 by depressing a key member on the setting unit 25.

An adder 30 operatively connected to the reference data memory 28 and the allowance setter 29 calculates an allowable upper limit data consisting of $(X_0+\Delta X)$ which are inputted respectively from these elements 28 and 29. Data X regarding the injection pressure of one injection operation cycle detected by the sensor 22 after the reference data $X_0$ has been set in the reference data memory 28 is compared in a comparator 31 with the data $(X_0+\Delta X)$ transferred from the adder 30. The comparator 31 then compares and discriminates whether or not the data X exceeds the data $(X_0+\Delta X)$, and in other words, the comparator 31 monitors whether or not a deviation $(X-X_0)$ between the detected data X and the reference data $X_0$ exceeds the allowance data $\Delta X$.

A switching unit 32 including two elements 32a and 32b is operatively connected to the comparator 31 and switched to the element 32a or 32b in accordance with a signal CH generated from the signal control circuit 26 by depressing a key member on the setting unit 25 so that an alarm information is generated acoustically or visually, when switched to the element 32a, at a time when the detected data X exceeds the upper limit data $(X_0+\Delta X)$ and an alarm information is not generated, when switched to the element 32b, even if the detected data X exceeds the upper limit data $(X_0+\Delta X)$. A time setter 33 is connected to the switching unit 32 so as to operate the element 32a or 32b by a predetermined time interval and to set or clear the time in accordance with a signal from the signal control circuit 26.

The pressure monitoring apparatus according to this invention will be operated as follows.

When it is required to monitor the injection pressure of the injection molding machine, a key member on the setting unit 25 is first depressed thereby to generate a clock pulse CL from the signal control circuit 26 to start the counting of the time required for the injection process as well as to transmit a starting signal STA to the contact circuit 24 to start the operation of the monitoring apparatus. When an operator discriminates that the data regarding the injection pressure stored in the data memory 27 can be deemed as the reference data, he depresses a key member on the setting unit 25 to transmit the signal EN from the control circuit 26 thereby to shift and store the data into the reference data memory 28 as the reference data $X_0$. After the reference data $X_0$ has been set in the reference data memory 28, all data detected by the sensor 22 are inputted in the comparator 31, in which the data are continuously compared during the injection operation with the data $(X_0+\Delta X)$ from the adder 30.

In this comparison in the comparator 31, if the detected data X exceeds the upper limit data $(X_0+\Delta X)$, an alarm information is generated acoustically or visually. In addition, by preliminarily setting a predetermined time interval in the time setter 32, it becomes possible to generate or stop an alarm information for the predetermined time interval, or to monitor or stop the monitoring of the injection operation for the predetermined time interval.

Figure 1:
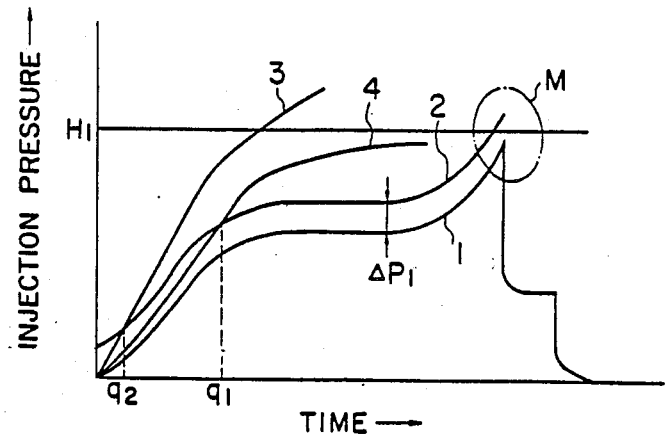
FIG. 1 is a graph showing one example of an injection pressure transition with time during an injection operation of an injection molding machine.
Figure 2:
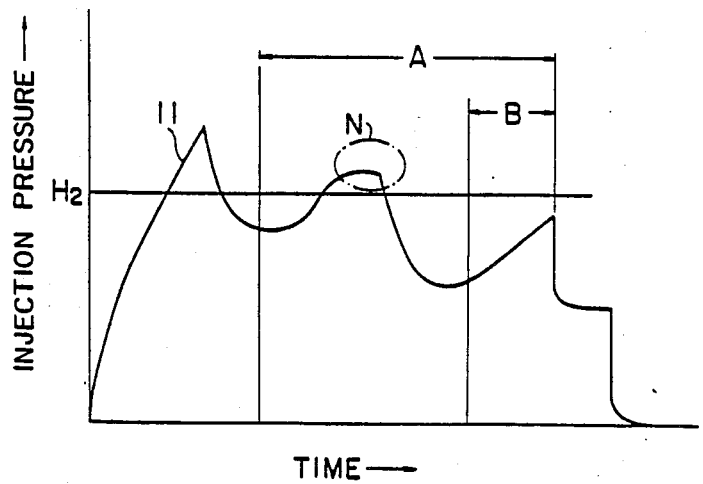
FIG. 2 is a graph showing another example of an injection pressure transition with time.

According to this invention, for example, regarding the injection pressure curve 4 shown in FIG. 1, an abnormal pressure condition can be monitored at a point $q_1$ at which the curve 4 exceeds the curve 2 which represents the allowable upper limit data, and also regarding the curve 3, an abnormal pressure condition can be detected at a point $q_2$ which is far below the set pressure $H_1$. Thus, it is possible to make preparation against the dangerous pressure condition to prevent the molds and the injection molding machine from being accidentally broken. In addition, according to this invention, it is possible to optionally select time intervals to be monitored or not in the multipoint sampling procedure time, for example, a time interval from the starting point of the injection operation cycle.

Further, it will be understood that, in the embodiment described above, although the injection time is treated as an operation parameter, a screw position in the injection molding machine may also be available as an operation parameter.

What is claimed is:

1. A method of monitoring data regarding continuously varying injection pressure in an injection process of an injection molding machine comprising the steps of: detecting data regarding the injection pressure as a variable of time using multipoint sampling for one injection operation cycle of said machine, storing detected data of said one injection operation cycle as reference data, detecting data regarding the injection pressure as a variable of time using multipoint sampling for another injection operation cycle of said machine, comparing said stored reference data with said detected data regarding the injection pressure in said another injection operation cycle, and generating an alarm information when a deviation between said detected data for said another operation cycle and said reference data exceeds a predetermined limit.

2. The method according to claim 1 wherein generation of the alarm information is stopped for a predetermined time interval during a data sampling time.

3. The method according to claim 2 wherein said predetermined time interval in which the generation of the alarm information is stopped, starts from a starting time of the injection process of the injection molding machine.

* * * * *